United States Patent
Grafulla-González et al.

(10) Patent No.: US 9,729,847 B2
(45) Date of Patent: Aug. 8, 2017

(54) 3D VIDEO COMMUNICATIONS

(75) Inventors: Beatriz Grafulla-González, Solna (SE); Ivana Girdzijauskas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/418,124

(22) PCT Filed: Aug. 8, 2012

(86) PCT No.: PCT/SE2012/050863
§ 371 (c)(1),
(2), (4) Date: Jan. 29, 2015

(87) PCT Pub. No.: WO2014/025293
PCT Pub. Date: Feb. 13, 2014

(65) Prior Publication Data
US 2015/0163476 A1    Jun. 11, 2015

(51) Int. Cl.
*H04N 7/14*    (2006.01)
*H04N 13/00*    (2006.01)
(Continued)

(52) U.S. Cl.
CPC ....... *H04N 13/0029* (2013.01); *H04L 65/602* (2013.01); *H04N 7/152* (2013.01); *H04N 13/0059* (2013.01); *H04N 13/0062* (2013.01)

(58) Field of Classification Search
USPC ... 348/14.01, 14.08, 14.09, 43, 51, E13.026, 348/E13.075
See application file for complete search history.

(56) References Cited

U.S. PATENT DOCUMENTS

| 6,014,712 A | 1/2000 | Islam et al. |
| 2008/0141175 A1* | 6/2008 | Sarna ............... H04L 29/06027 715/848 |

(Continued)

FOREIGN PATENT DOCUMENTS

| EP | 2290968 | * 4/2009 | ............... H04N 7/14 |
| EP | 2 290 968 | * 2/2011 | ............... H04N 7/14 |

(Continued)

OTHER PUBLICATIONS

PCT Written Opinion of the International Searching Authority for International application No. PCT/SE2012/050863, Mar. 19, 2014.
(Continued)

*Primary Examiner* — Yosef K Laekemariam
(74) *Attorney, Agent, or Firm* — Baker Botts, LLP (57) ABSTRACT

The disclosed embodiments relate to determining transmit formats and receive formats for a 3D video communication service. Sets of available 3D video communication transmit formats are received. Each set is associated with a client device. Sets of available 3D video communication receive formats are received. Each set is associated with one of the client devices. One format for transmission of 3D video communication from the at least one client device to the other client devices is determined for at least one of the client devices. The one format is a member of both the set of available 3D video communication transmit formats associated with the at least one client device and the received available 3D video communication receive formats associated with other client devices.

19 Claims, 3 Drawing Sheets

(51) Int. Cl.
 *H04L 29/06* (2006.01)
 *H04N 7/15* (2006.01)

(56) References Cited

U.S. PATENT DOCUMENTS

| | | | |
|---|---|---|---|
| 2010/0149302 A1 | 6/2010 | Malik | |
| 2011/0043614 A1* | 2/2011 | Kitazato | H04N 13/0059 348/51 |
| 2012/0281066 A1* | 11/2012 | Ohbitsu | H04N 21/25808 348/43 |

FOREIGN PATENT DOCUMENTS

| | | |
|---|---|---|
| EP | 2 290 968 | 3/2011 |
| EP | 2 451 176 | 5/2012 |

OTHER PUBLICATIONS

PCT International Search Report for International application No. PCT/SE2012/050863, Mar. 19, 2014.

* cited by examiner

3D VIDEO COMMUNICATIONS

PRIORITY

This nonprovisional application is a U.S. National Stage Filing under 35 U.S.C. §371 of International Patent Application Serial No. PCT/SE2012/050863, filed Aug. 8, 2012 and entitled "3D VIDEO COMMUNICATIONS".

TECHNICAL FIELD

Embodiments presented herein relate to 3D video communication in general and particularly to methods, devices and computer programs for determining transmit formats and receive formats for a 3D video communication service.

BACKGROUND

For video communication services, there is always a challenge to obtain good performance and capacity for a given communications protocol, its parameters and the physical environment in which the video communication service is deployed.

In recent years, video conferencing has become an important tool of daily life. In the business environment, it enables a more effective collaboration between remote locations as well as the reduction of travelling costs. In the private environment, video conferencing makes possible a closer, more personal communication between related people. In general, although 2D video conferencing systems provide a basic feeling of closeness between participants, the user experience could still be improved by supplying a more realistic/immersive feeling to the conferees. Technically, this could be achieved, among others, with the deployment of 3D video, which adds depth perception to the user visual experience and also provides a better understanding of the scene proportions.

3D video conferencing may be enabled in many different forms. To this effect, 3D equipment such as stereo cameras and 3D displays have been deployed. 3D video or 3D experience commonly refers to the possibility of for a viewer, getting the feeling of depth in the scene or, in other words, to get a feeling for the viewer to be in the scene. In technical terms, this may generally be achieved both by the type of capture equipment (i.e. the cameras) and by the type of rendering equipment (i.e. the display) that are deployed in the system.

Although many standardization bodies are working on 3D-related standards, currently there is no common standard for 3D formats. This results in that there is not a unique way of capturing, transmitting and displaying 3D video communication services, which thus directly impacts 3D video conferencing systems.

SUMMARY

The incorporation of 3D video to video conferencing systems leads to new usage possibilities as well as to new scenarios where the immersive feeling provided could be beneficial. Also, it leads to potential problems in the video format and codec selections. There exist many different 3D video format and codec options for transmission and reception of 3D video that may be combined depending on the equipment deployed in each client device. As will be further disclosed below, a client device typically comprises, or is operatively connected to, a capture unit (i.e. one or more cameras) and a display unit (i.e. a unit for rendering received video streams). For example, if a user would like to connect any 3D camera or display to a 3D video conferencing system, the user will have to choose a video format that other parties to the 3D video conferencing system can properly receive and display. In parallel, the other users of the 3D video conference should also be aware of what format can be properly understood and displayed on his/her display. Additionally, in known systems the devices transmit to other devices at most the format(s) that the device is able to receive. In order to provide interoperability between the client devices and given that there is a lack of a standard solution, it is an object of the embodiments presented herein to provide automatic selection for video formats and coding depending on the equipment connected to each client device. Thereby a video communications system is arranged to automatically choose the correct transmitting and receiving video format and codec depending on the equipment used by all participating parties.

A further object is to adapt received streams according to the properties of the display units of each client device. To this effect, a video communications system preferably utilizes proper signalling of what entities are connected and of what one client device can transmit and receive. Likewise, the inventors of the enclosed embodiments have discovered that client devices may need to adapt the processing of received video streams depending on what streams are sent from the other client devices and the type of display connected to the client device (for example, if the received video is in a texture+depth format, but the display is only capable of displaying a 2D image format. In such a case the depth should be discarded).

According to a first aspect a method of determining transmit formats and receive formats for a 3D video communication service is provided. Sets of available 3D video communication transmit formats are received. Each set is associated with a client device. Sets of available 3D video communication receive formats are received. Each set is associated with one of the client devices. One format for transmission of 3D video communication from the at least one client device to the other client devices is determined for at least one of the client devices. The one format is a member of both the set of available 3D video communication transmit formats associated with the at least one client device and the received available 3D video communication receive formats associated with other client devices.

Advantageously the disclosed subject matter allows interoperability between client devices.

Further, advantageously the disclosed subject matter is independent of the specific equipment used at the client device.

Further, advantageously the disclosed subject matter enables the selection of formats to be transparent for the user.

Further, advantageously the disclosed subject matter enables re-usage of current video communications systems, although with modifications, i.e. current video communications systems may be used both as a 2D system (like the current system) or in a 3D system context.

According to a second aspect a computer program of determining transmit formats and receive formats for 3D video communication is provided. The computer program comprises computer program code which, when run on a processing unit, causes the processing unit to perform a method according to the first aspect.

According to a third aspect a computer program product comprising a computer program according to the second aspect and a computer readable means on which the computer program is stored are provided.

According to a fourth aspect a local client device for determining transmit formats and receive formats for 3D video communication is provided. The local client device comprises a receiver arranged to acquire a set of available 3D video communication transmit formats from a local capturing unit and to acquire a set of available 3D video communication receive formats from a local display unit The local client device further comprises a transmitter arranged to transmit the acquired available 3D video communication transmit and receive formats to remote client devices. The receiver is further arranged to receive acquired available 3D video communication transmit and receive formats from the remote client devices. The local client device comprises a processing unit arranged to determine one format for transmission of 3D video communication from the local client device to the remote client devices, the one format being a member of both the acquired set of available 3D video communication transmit formats and the available 3D video communication receive formats received from the remote client devices.

According to a fifth aspect a central device for determining transmit formats and receive formats for 3D video communication is provided. The central device comprises a receiver arranged to receive, from each of a plurality of client devices, a set of available 3D video communication transmit formats and a set of available 3D video communication receive formats. The central devices further comprises a processing unit arranged to determine, for each client device of the plurality of client devices, one format for transmission of 3D video communication from one client device to other client devices, the one format being a member of both the set of available 3D video communication transmit formats associated with said one client device and the received available 3D video communication receive formats associated with the other client devices.

It is to be noted that any feature of the first, second, third, fourth and fifth aspects may be applied to any other aspect, wherever appropriate. Likewise, any advantage of the first aspect may equally apply to the second, third, fourth and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the invention will now be described, by way of non-limiting examples, references being made to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
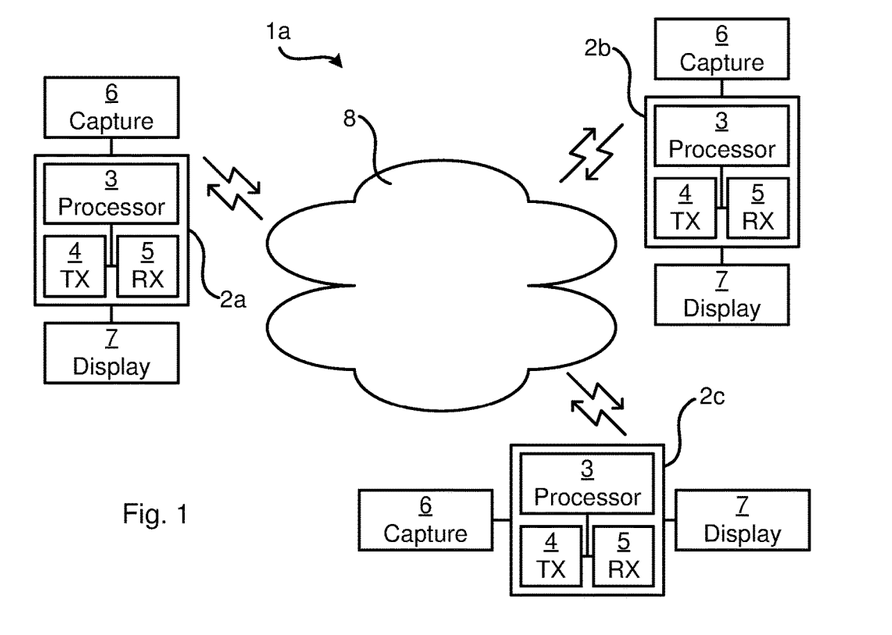
FIGS. 1 and 2 are schematic diagrams illustrating video communications systems where embodiments presented herein may be applied.
Figure 2:
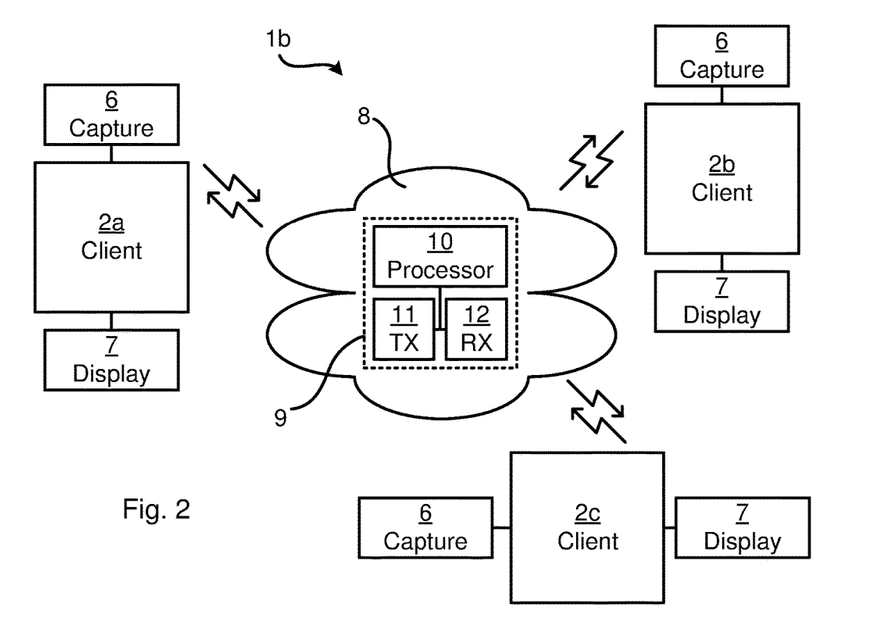
Figure 5:
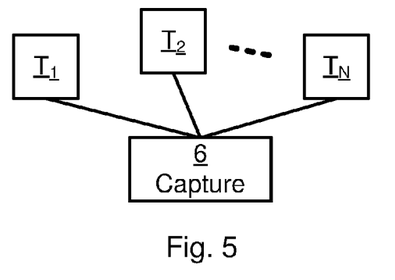
FIG. 5 is a schematic diagram illustrating transmit formats of a capture device.
Figure 6:
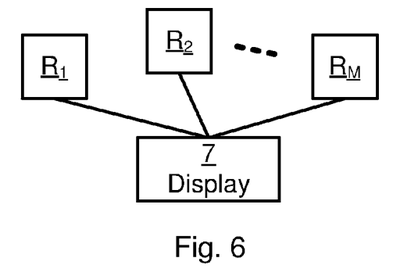
FIG. 6 is a schematic diagram illustrating receive formats of a capture device.

Consider the video communications systems 1a, 1b illustrated in FIGS. 1 and 2. The video communications systems 1a, 1b of FIGS. 1, 2 comprise a number of video conferencing client devices 2a, 2b, 2c. As the skilled person understands these are just examples of video communications systems where the disclosed subject matter applies. Thus although only three client devices 2a, 2b, 2c are illustrated in FIGS. 1 and 2, there may in practical situations be a large combination of client devices 2a, 2b, 2c with different 2D/3D equipment. The clients devices 2a, 2b, 2c are operatively connected via a communications network 8. Each client device 2a, 2b, 2c comprises, or is operatively connected to, a capture unit 6 (i.e. one or more cameras) and a display unit 7 (i.e. a unit for rendering received video streams) that require different video formats and codecs. FIG. 5 schematically illustrates a capture unit 6 being associated with a number of transmit formats T1, T2, $T_N$. FIG. 6 schematically illustrates a display unit 7 being associated with a number of receive formats R1, R2, $R_M$.

For example, if a capture unit 6 in form of a 2D camera and a display unit comprising a display and polarized glasses to be used by the user are connected to client device 2a, then this latter will be able to transmit plain 2D video but would like to receive frame compatible format video with stereo content. However, the stream(s) that client device 2a receives may be different from the wished format, as it also depends on the equipment from the other client devices 2b, 2c. For example, if now client device 2b has a texture+depth camera, then client device 2a will only receive a frame compatible format video including texture+depth. In this case, client device 2a will have to adapt the 3D video stream received to a frame compatible format video including stereo. To this effect, client device 2a will synthesize the new view with the information contained in the texture+depth received. On the other hand, if a new client device 2c will be connected to the video communications system, then a new adaptation will be required.

In general terms there are two main categories for capture and display equipment; 2D, which is kept for legacy, or 3D, which is in turn divided into different possibilities. In terms of capture units, 3D images can be obtained by means of a stereo camera where separate left and right views of the scene are captured, with a rig of multiple cameras where multiple views of the scene are captured, with a texture camera and a depth camera (e.g. an infrared camera), or with multiple texture cameras and multiple depth cameras. The selection of the camera determines the video format that can be transmitted from a client device. Similarly, 3D displays may be classified into stereo displays that require special purpose glasses and auto-stereoscopic displays that do not require such special purpose glasses. Displays with polarized or shutter glasses are typical cases for stereo displays with glasses; whereas barrier parallax or lenticular arrays are the typical technologies for two-view or multi-view auto-stereoscopic displays. Likewise, the selection of the display determines the video format that can be received by the client device.

Table 1 summarizes examples of capture units and display units that can be connected to a 3D video conferencing system, such as the video communications systems 1a, 1b of FIGS. 1, 2. As the skilled person understands, other and/or additional equipment may be also deployed.

TABLE 1

Capture units and display units for 3D video communications

| Capture units | Display units |
|---|---|
| 2D camera | 2D display |
| 3D camera | 3D display |
| Stereo camera | Display using polarized-glasses |
| Rig with multiple cameras | Display using shutter-glasses |
| Texture and depth cameras | Two-view auto-stereoscopic display (glasses free) |
| Multiple texture + depth cameras | Multi-view auto-stereoscopic display (glasses free) |

For each capture unit and display unit type possible, video format and coding options could also be determined. Table 2 summarizes video formats and coding options for the capture unit types listed in Table 1. As the skilled person understands, the 3D video streams delivered by one capture unit type may be combined in different ways and therefore several options may be possible for each capture unit type.

TABLE 2

Video format and coding options for different capture unit types

| Capture unit | Video format and coding options |
|---|---|
| Conventional 2D camera | Conventional 2D video coding, e.g. H.264/AVC or HEVC |
| Stereo camera | Simulcast (i.e. two separated streams encoded with e.g. H.264/AVC or HEVC) Frame compatible formats (e.g. side-by-side, top-bottom), encoded with some of 2D codecs Multi-view Video Coding (MVC) MPEG 3DV (currently under development in MPEG) |
| Rig with multiple cameras | Simulcast (i.e. separated streams) Multi-view Video Coding (a.k.a. MVC) MPEG 3DV |
| Texture + depth camera | Simulcast (i.e. two separated streams) Frame compatible formats MPEG 3DV |
| Multiple texture + depth cameras | Simulcast (i.e. separated streams) Multi-view Video Coding (separately applied to texture and depth) MPEG 3DV |

Similarly, Table 3 lists the video format and coding options for the display unit types of Table 1. Table 3 considers the input formats to the displays units, not the format needed to achieve a 3D experience. For example, for a polarized screen, the input required is a side-by-side stream that the display unit itself horizontally interlaces to match the screen polarized lines. Since this operation is performed directly by the display unit, the interlaced format is not considered as the input explicitly required, but rather the side-by-side format.

TABLE 3

Video format and coding options for each display unit type

| Display unit | Video format and coding options |
|---|---|
| 2D display | Conventional 2D video coding, e.g. H.264/AVC or HEVC |
| Polarized-glasses display | Frame compatible formats Multi-view Video Coding (MVC) MPEG 3DV (for the texture + depth input) |
| Shutter-glasses display | Conventional 2D video coding but at double the frame rate Multi-view Video Coding (MVC) MPEG 3DV |
| Two-view auto-stereoscopic display (glasses free) | Frame compatible formats Multi-view Video Coding (MVC) MPEG 3DV (for the texture + depth input) |
| Multi-view auto-stereoscopic display (glasses free) | Frame compatible formats Multi-view Video Coding (MVC) MPEG 3DV (for the texture + depth input) |

As noted above, one object of the disclosed subject matter is to provide automatic selection for video formats and coding depending on the equipment connected to each client device 2a, 2b, 2c. In order to do so, there is provided a client device 2a, 2b, 2c (preferably with functional components as illustrated in FIG. 1) and/or a central device 9 (preferably with functional components as illustrated in FIG. 2). In general, several client devices 2a, 2b, 2c enable a distributed implementation whereas one central device 9 enables a central implementation of the herein disclosed subject matter. A particular client device under consideration may be termed a local client device; in such a case the remaining client devices are termed remote client devices.

Figure 3:
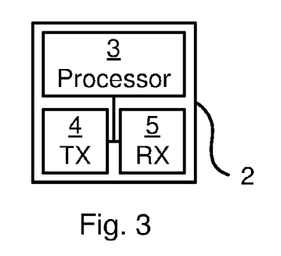
FIG. 3 is a schematic diagram showing functional modules of a local client device.

According to a first preferred embodiment the client devices 2a, 2b, 2c of FIG. 1 are arranged for determining transmit formats T1, T2, $T_N$ and receive formats R1, R2, $R_M$ for 3D video communication and comprises a processing unit 3, a transmitter 4 and a receiver 5. FIG. 3 illustrates such a client device 2. The client device 2 may be part of a stationary computer, a laptop computer, a tablet computer, or a mobile phone. In more detail, FIG. 3 schematically illustrates, in terms of a number of functional modules, the components of a client device 2, such as any of the local client devices 2a, 2b, 2c of FIG. 1. A processing unit 3 is provided using any combination of one or more of a suitable central processing unit (CPU), multiprocessor, microcontroller, digital signal processor (DSP), application specific integrated circuit (ASIC) etc., capable of executing software instructions stored in a computer program product 13 (as in FIG. 7). Thus the processing unit 3 is thereby preferably arranged to execute methods as herein disclosed. The client device 2 further comprises an input/output (I/O) interface in the form of a transmitter (TX) 4 and a receiver (RX) 5, for communicating with other client devices over the communications network 8, with a capturing unit 6 and a display unit 7. Other components, as well as the related functionality, of the client device 2 are omitted in order not to obscure the concepts presented herein.

Figure 4:
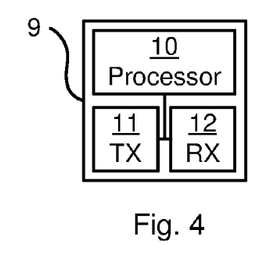
FIG. 4 is a schematic diagram showing functional modules of a central device.

According to a second preferred embodiment the central device 9 of FIG. 2 is arranged for determining transmit formats T1, T2, $T_N$ and receive formats R1, R2, $R_M$ for 3D video communication and comprises a processing unit 10, a transmitter ii and a receiver 12. FIG. 4 illustrates such a central device 9. The central device 9 is preferably part of a network server, but may also be part of a stationary computer, a laptop computer, a tablet computer, or a mobile phone acting as a host for a 3D video communication service. In more detail, FIG. 4 schematically illustrates, in terms of a number of functional modules, the components of a central device 9, such as the central device 9 of FIG. 2. A processing unit 10 is provided using any combination of one or more of a suitable central processing unit (CPU), multi-processor, microcontroller, digital signal processor (DSP), application specific integrated circuit (ASIC) etc., capable of executing software instructions stored in a computer program product 13 (as in FIG. 7), Thus the processing unit 10 is thereby preferably arranged to execute methods as herein disclosed. The central device 9 further comprises an input/output (I/O) interface in the form of a transmitter (TX) 11 and a receiver (RX) 12, for communicating with local client devices 2a, 2b, 2c over the communications network 8. Other components, as well as the related functionality, of the central device 9 are omitted in order not to obscure the concepts presented herein.

Figure 7:
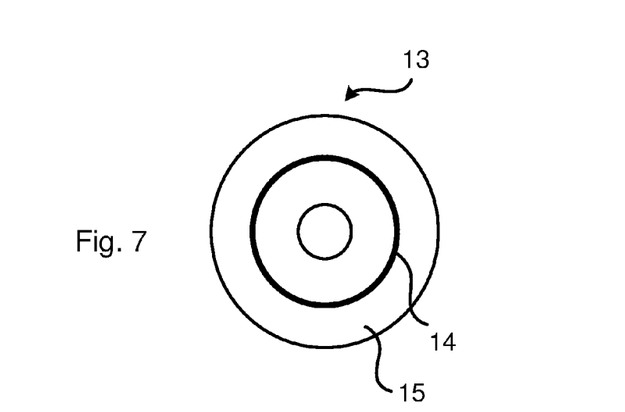
FIG. 7 shows one example of a computer program product comprising computer readable means.
Figure 8:
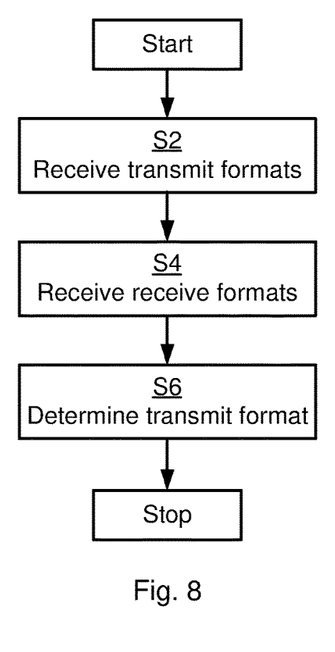
FIGS. 8 and 9 are flowcharts of methods according to embodiments.
Figure 9:
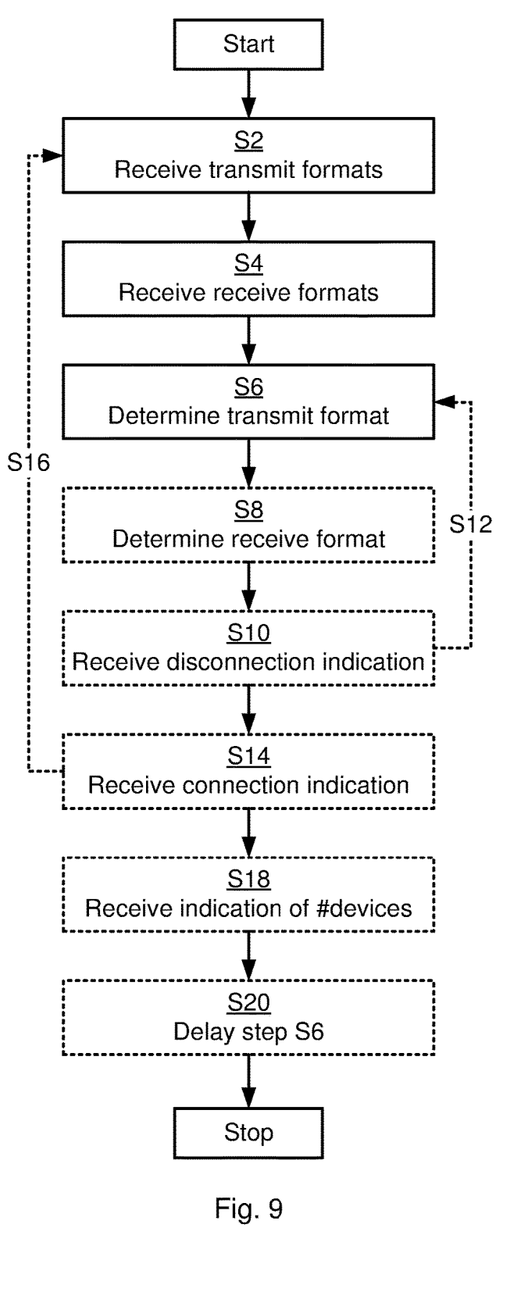

FIGS. 8 and 9 are flowcharts illustrating embodiments of methods of determining transmit formats T1, T2, $T_N$ and receive formats R1, R2, $R_M$ for a 3D video communication service. The methods are preferably distributively performed in each one of the client devices 2a, 2b 2c or in the central device 9. The methods are advantageously provided as computer programs 14. FIG. 7 shows one example of a computer program product 13 comprising computer readable means 15. On this computer readable means 15, a computer program 14 can be stored. This computer program 14 can cause the processing unit 3 of the client devices 2a, 2b, 2c and thereto operatively coupled entities and devices to execute methods according to embodiments described herein. The computer program 14 can alternatively or additionally cause the processing unit 10 of the central device 9 and thereto operatively coupled entities and devices to execute methods according to embodiments described herein. In the example of FIG. 7, the computer program product 13 is illustrated as an optical disc, such as a CD (compact disc) or a DVD (digital versatile disc) or a Blu-Ray disc. The computer program product could also be embodied as a memory (RAM, ROM, EPROM, EEPROM) and more particularly as a non-volatile storage medium of a device in an external memory such as a USB (Universal Serial Bus) memory. Thus, while the computer program 14 is here schematically shown as a track on the depicted optical disk, the computer program 14 can be stored in any way which is suitable for the computer program product 13.

Consider now the video communications systems 1a, 1b of FIGS. 1 and 2.

According to the scenarios illustrated in FIGS. 1 and 2, each client device 2a, 2b, 2c determines the equipment used on its site. Each site is defined by a client device 2a, 2b, 2c. Assume, for example, that client device 2a comprises or is operatively connected to a capture unit 6 in the form of a conventional 2D camera and a display unit 7 in the form of a conventional 2D display. Assume further that client device 2b comprises or is operatively connected to a capture unit 6 in the form of a texture+depth camera and comprises or is operatively connected to a display unit 7 in the form of a stereo display that requires polarized glasses. Assume further that client device 2c comprises or is operatively connected to a capture unit 6 in form of a stereo camera and comprises or is operatively connected to a display unit 7 in form of a multi-view auto-stereoscopic display (glasses free). Then, given the equipment at each site, each client device 2a, 2b, 2c determine the codecs/formats that can be transmitted from and received by the capture unit and display unit, respectively, of that client device 2a, 2b, 2c. Thus, in a step S2 sets of available 3D video communication transmit formats is received by each client device from its capture unit, each set being associated with a client device 2, 2a, 2b, 2c. Further, in step S4 sets of available 3D video communication receive formats is received by each client device from its display unit, each set being associated with one of the client devices 2, 2a, 2b, 2c. For the embodiment illustrated in FIG. 1 the receiver 5 of each client device 2a, 2b, 2c is arranged to acquire a set of available 3D video communication transmit formats from its local capturing unit 6 and to acquire a set of available 3D video communication receive formats from its local display unit 7. This information may then be sent to the other client devices.

For the embodiment illustrated in FIG. 1 the transmitter 4 of each client device 2a, 2b, 2c is arranged to transmit the acquired available 3D video communication transmit and receive formats to the other (i.e. remote) client devices 2a, 2b, 2c. For the embodiment illustrated in FIG. 2 the receiver 12 of the central device 9 is arranged to receive, from each of the client devices 2a, 2b, 2c, a set of available 3D video communication transmit formats and a set of available 3D video communication receive formats. Table 4 summarises the information collected from all client devices 2a, 2b, 2c.

TABLE 4

Information contained in the messages sent by each client device

| | Client device 2a | Client device 2b | Client device 2c |
|---|---|---|---|
| Client device can transmit: | Plain 2D | FC T + D<br>T + D<br>Plain 2D | FC stereo<br>T + T<br>Plain 2D |
| Client device can receive: | Plain 2D<br>FC stereo<br>FC T + D<br>T + T<br>T + D<br>MT + MD | FC stereo<br>T + T<br>FC T + D<br>T + D<br>MT + MD<br>Plain 2D | MT + MD<br>T + D<br>FC T + D<br>FC stereo<br>T + T<br>Plain 2D |

Legend:
FC T + D = frame compatible format including texture + depth
T + D = texture + depth in separated streams
FC stereo = frame compatible format including stereo
T + T = texture + texture in separated streams
MT + MD = multiple textures + multiple depths in separated streams At this point, according to the embodiment of FIG. 1, each client device 2a, 2b, 2c has received the information from the other client devices 2a, 2b, 2c. The client devices 2a, 2b, 2c then scan the "Client device can receive" list from each other client device 2a, 2b, 2c and compare it to what the client device itself can transmit. According to the embodiment of FIG. 2, the central device 9 has received the information from all the client devices 2a, 2b, 2c and thus compares what transmit formats and receive formats each client device 2a, 2b, 2c can transmit and receive. Particularly, in a step S6 one format for transmission of 3D video communication from at least one of the client device to the other client devices is determined. The determined format for transmission is a member of both the set of available 3D video communication transmit formats associated with the at least one client device and the received available 3D video communication receive formats associated with other client devices. According to the embodiment of FIG. 1 the determination is performed by the processing unit 3 of the client device 2, 2a, 2b, 2c. According to the embodiment of FIG. 2 the determination is performed by the processing unit 10 of the central device 9.

If for a client device the first transmit format option is contained in all the "Client device can receive" lists, then preferably the first format becomes the transmission format of the client device. If the first transmit format is not contained in the list, then the client device (or the central device) investigates the next format until there is a consensus between the formats of the client devices. If there is no consensus, then the client device will use a plain 2D video format to transmit as this format is receivable by all client devices. For example, consider client device 2b. Its first transmission format is "frame compatible format including texture+depth", which is contained both in client device 2a and client device 2c's "Client device can receive" lists. So client device 2b sets its transmission format to "frame compatible format including texture+depth".

The "Client device can receive" lists may be ordered according to preference. A number of ways exist to determine the ordering of the "Client device can receive" list. For example, each display unit 7 (which is associated with a client device) may determine the priority ordering of the receive formats. Alternatively there may be a global criteria to determine the priority ordering of the receive formats. In other words, the sets of available 3D video communication receive formats may have a preference order according to a preference criterion common for all client devices 2a, 2b, 2c.

In a similar way, each client device 2a, 2b, 2c (or the central device 9) process the "Client device can transmit" lists and will compare the content to what the client device itself is arranged to receive. If the first option is available in the list of the client device itself, then the first option will become the reception format. If the first option is not in the list, then the client device (or the central device 9) will investigate the next option until a match is found. If there is no matching, the client device will consider that it is receiving plain 2D from a remote client device.

The "Client device can transmit" lists may be ordered according to preference. A number of ways exist to determine the ordering of the "Client device can transmit" list. For example, each capturing unit 6 may determine the priority ordering of the transmit formats. Each set of available 3D video communication transmit formats may, for example, be associated with one capturing unit 6 as in FIG. 5. Further, each capturing unit 6 may be associated with one client device 2a, 2b, 2c as in FIGS. 1 and 2. A preference order of the set of available 3D video communication transmit formats associated with one client device is determined by the capturing unit associated with that one client device. Alternatively there may be a global criteria to determine the priority ordering of the transmit formats. In other words, the sets of available 3D video communication transmit formats may have a preference order according to a preference criterion common for all client devices 2a, 2b, 2c.

For example in the case of client device 2b, it considers the "Client device can transmit" list of client device 2a which starts with "plain 2D". Since this format is in client device 2b's "Client device can receive" list, it is accepted as the transmit format of client device 2a. Then client device 2b goes through client device 2c's "Client device can transmit" list. The first option is "frame compatible format including stereo" which is also included in client device 2b's "Client device can receive" list. So this means that client device 2b is going to receive in format "plain 2D" from client device 2a and in format "frame compatible format including stereo" from client device 2c. Each client device 2a, 2b, 2c is thereby enabled to prepare the processing chain for receiving 3D video streams from the other client devices.

This process may also be performed by the central device 9. Thus, according to the embodiment of FIG. 2 the processing unit 10 of the central device 9 is arranged to determine one format for transmission of 3D video communication for each client device. The transmitter ii of the central device 9 is preferably arranged to transmit the determined one format for transmission of 3D video communication to other client devices in the video communications systems 1b.

The client devices 2a, 2b, 2c according to the embodiment of FIG. 1 or the central device 9 according to the embodiment of FIG. 2 may then transmit a response message to client devices stating what format each client device will transmit and optionally also what format to receive. In order to do so, in a step S8 one format for reception of 3D video communication from the other client devices to at least one client device may be determined. The one format for reception is preferably a member of both the set of available 3D video communication receive formats associated with the at least one client device and the received available 3D video communication transmit formats associated with other client devices. According to embodiments, only information relating to the determined transmit formats is transmitted; information relating to the determined receive formats is not transmitted. Table 5 shows the response messages for the transmit and receive formats of Tables 3 and 4. Thus, with respect to Table 5, the information "Client device will receive" is only transmitted according to some embodiments.

TABLE 5

Response information from the client devices

|  | Client device 2a | Client device 2b | Client device 2c |
|---|---|---|---|
| Client device will transmit: | Plain 2D | FC T + D | FC stereo |
| Client device will receive: | FC T + D (from client device 2b) FC stereo (from client device 2c) | Plain 2D (from client device 2a) FC stereo (from client device 2c) | Plain 2D (from client device 2a) FC T + D (from client device 2b) |

Legend:
FC stereo = frame compatible format including stereo
FC T + D = frame compatible format including texture + depth Each client device 2a, 2b, 2c may then start transmitting the 3D video stream in its determined transmit format and start receiving the 3D video stream in the determined transmit formats of the other client devices.

In a case where an existing client device disconnects from an ongoing 3D video communication service, there is preferably a re-negotiation of the formats that can be transmitted and received. Particularly, in a step S10 an indication of at least one client device being disconnected from the 3D video communication service is received (either by the receiver 5 of the client devices 2a, 2b, 2c or by the receiver 12 of the central device 9). In a step S12 the step S6 (and possibly also S8) may then be repeated for all client devices still being connected to the 3D video communication service. For example, considering the example disclosed above, where client device 2a comprises or is operatively connected to a capture unit 6 in form of a stereo camera, client device 2b and client device 2c both comprise or are operatively connected to display units 7 in form of 2D screens, and a further client device (not illustrated) comprises or is operatively connected to a display unit in form of a stereo display with polarized glasses. Assume further that client device 2a currently is transmitting a frame compatible format including stereo. If the further client device leaves the ongoing 3D video communication service, then client device 2a may start transmitting plain 2D video to adapt to the other two client devices 2b, 2c.

In a case where a new client device connects to an ongoing 3D video communication service, there is preferably a re-negotiation of the formats that can be transmitted and received. Particularly, in a step S14 an indication of at least one further client device being connected to the 3D video communication service is received (either by the receiver 5 of the client devices 2a, 2b, 2c or by the receiver 12 of the central device 9). In a step S16 the steps S2, S4, S6 (and possibly also S8) may then be repeated for all client devices (including the at least one newly connected client device) connected to the 3D video communication service. For example, consider that client device 2a comprises or is operatively connected to a capture unit 6 in form of a stereo camera, but that client devices 2b and 2c both comprise or are operatively connected to display units 7 in form of 2D displays. In this case, client device 2a may transmit in a plain 2D format. However, if a further client device (not illustrated) later connects to the 3D video communication service and the further client device comprises or is operatively connected to a display unit in form of a stereo display that requires polarized glasses, then client device 2a may transmit in a frame compatible format including stereo, since it will enable the user of the further client device to watch 3D video and client devices 2b and 2c still be associated with the 2D content. Once the formats are decided, then the further client device may join the 3D video communication service and the client devices already being connected to the ongoing 3D video communication service adapt their transmit and receive formats.

In order to avoid unnecessary re-negotiation of the formats there may be a delay before the determination of formats is made. For example, in a step S18 an indication of the number of client devices which are to be connected to a session of the 3D video communication service is received. The step S6 of determining transmit format(s) may then be delayed, in a step S20, until reception of an indication that at least a pre-determined fraction of the client devices have connected to the session of the 3D video communication service. The pre-determined fraction may correspond to 50%, preferably 75%, most preferably 100% of the number of client devices scheduled to join the session.

For a point-to-point 3D video communication session (i.e. a 3D video communication session involving only two client devices) the negotiation between the two client devices preferably considers only what the other client device is able to receive. In this way, each client device adapts its transmit format to the available receive formats of the other client device.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of determining transmit formats and receive formats for a 3D video communication service, comprising the steps of:
   receiving sets of available 3D video communication formats, each set of available 3D video communication formats being received from one of a plurality of client devices, each set of available 3D video communication formats comprising:
      at least one 3D transmit format for a type of a capture unit being associated with a client device; and
      at least one 3D receive format associated with a type of a display unit being associated with the client device; and
   using a preference criterion common for the plurality of client devices to determine a preference order for a plurality of 3D video transmit formats included in the sets of available 3D communication formats;
   based on the preference order for the plurality of 3D video transmit formats, comparing the sets of available 3D video communication formats to determine, for at least one client device, a particular 3D transmit format for transmission of 3D video communication by the type of the capture unit of the at least one client device that is a preferred 3D video transmit format and corresponds to a particular 3D receive format for receipt of 3D video communication by the type of the display device of at least one other client device; and
   transmitting, to the plurality of client devices, a message comprising the particular 3D transmit format to be used by the plurality of client devices during a video conference.

2. The method according to claim 1, wherein the method is performed in a central device.

3. The method according to claim 1, wherein the method is distributively performed in each one of the client devices.

4. The method according to claim 1, wherein each set of available 3D video communication transmit formats is associated with one capturing unit, each capturing unit being associated with one client device.

5. The method according to claim 4, wherein a preference order of the set of available 3D video communication transmit formats associated with said one client device is determined by said one capturing unit.

6. The method according to claim 1, wherein each set of available 3D video communication receive formats is associated with one display unit, each display unit being associated with one client device.

7. The method according to claim 6, wherein a preference order of the set of available 3D video communication receive formats associated with said one client device is determined by said one display unit.

8. The method according to claim 1, further comprising determining, based on the preference criterion common for the plurality of client devices, a preference order for a plurality of 3D video receive formats included in the sets of available 3D communication formats.

9. The method according to claim 1, further comprising determining, for at least one of the client devices, one format for reception of 3D video communication from the other client devices to the at least one client device, the one format for reception being a member of both the set of available 3D video communication receive formats associated with the at least one client device and the received available 3D video communication transmit formats associated with other client devices.

10. The method according to claim 1, further comprising
receiving an indication of at least one client device being
disconnected from the 3D video communication service; and
repeating, for all client devices still connected to the 3D video communication service, said step of: determining one format for transmission of 3D video communication for at least one of the client devices.

11. The method according to claim 1, further comprising
receiving an indication of at least one further client device being connected to the 3D video communication service; and
repeating, for all client devices connected to the 3D video communication service, said steps of: receiving sets of available 3D video communication transmit formats, receiving sets of available 3D video communication receive formats, and determining one format for transmission of 3D video communication for at least one of the client devices.

12. The method according to claim 1, further comprising
receiving an indication of the number of client devices to connect to a session of the 3D video communication service; and
delaying said step of determining one format for transmission of 3D video communication for at least one of the client device until reception of an indication that at least a pre-determined fraction of the client devices have connected to the session of the 3D video communication service.

13. The method according to claim 12, wherein the pre-determined fraction corresponds to 50%, preferably 75%, most preferably 100%.

14. A non-transitory computer program of determining transmit formats and receive formats for 3D video communication, the computer program comprising computer program code which, when run on a processing unit, causes the processing unit to
receive sets of available 3D video communication formats, each set of available 3D video communication formats being received from one of a plurality of client devices, each set of available 3D video communication formats comprising:
at least one 3D transmit format for a type of a capture unit being associated with a client device; and
at least one 3D receive format associated with a type of a display unit being associated with the client device;
use a preference criterion common for the plurality of client devices to determine a preference order for a plurality of 3D video transmit formats included in the sets of available 3D communication formats;
based on the preference order for the plurality of 3D video transmit formats, compare the sets of available 3D video communication formats to determine, for at least one of the client devices, a particular 3D transmit format for transmission of 3D video communication by the type of the capture unit of the at least one client device that is a preferred 3D video transmit format and corresponds to a particular 3D receive format for receipt of 3D video communication by the type of the display unit of at least one other client device; and
transmit, to the plurality of client devices, a message comprising the particular 3D transmit format to be used by the plurality of client devices during a video conference.

15. A non-transitory computer program product comprising a computer program according to claim 14 and a computer readable means on which the computer program is stored.

16. A local client device for determining transmit formats and receive formats for 3D video communication, comprising:
a receiver arranged to acquire a set of available 3D video communication transmit formats from a type of a local capturing unit and to acquire a set of available 3D video communication receive formats from a type of a local display unit;
a transmitter arranged to transmit the acquired available 3D video communication transmit and receive formats to at least one remote client device;
wherein the receiver is further arranged to receive acquired available 3D video communication formats, the available 3D video communication formats comprising:
available 3D video communication transmit formats for a type of a remote capturing unit of the at least one remote client device; and
available 3D video communication receive formats for a type of a remote displaying unit of the at least one remote client device; and
a processing unit operable to:
use a preference criterion common for the local client device and the remote client device to determine a preference order for a plurality of 3D video transmit formats included in the sets of available 3D communication formats;
based on the preference order for the plurality of 3D video transmit formats, compare the set of available 3D video communication transmit formats for the type of the local capturing unit and the set of available 3D video communication receive formats for the type of the local display unit with the available 3D video communication formats from the at least one remote client device to determine at least one of:
a first particular 3D transmit format for the type of capturing unit that is a preferred 3D video transmit format and corresponds to a first particular 3D receive format for receipt of 3D video communication by a type of a display unit of the at least one remote client device; and
a second particular 3D receive format for the type of display unit that is a preferred 3D video transmit format and corresponds to a second particular 3D transmit format for transmission of 3D video communication by a type of a capturing unit of the at least one remote client device; and
wherein the transmitter is further arranged to transmit, to the at least one remote client device, a message comprising the first particular 3D transmit format to be used by the at least one remote client device during a video conference.

17. The local client device according to claim 16, wherein the transmitter further is arranged to transmit the determined one format for transmission of 3D video communication to the remote client devices.

18. A central device for determining transmit formats and receive formats for 3D video communication, comprising:
a receiver arranged to receive, from each of a plurality of client devices, a set of available 3D video communi cation formats, each set of available 3D video communication formats comprising:
  at least one 3D transmit format for a type of a capture unit being associated with a client device; and
  at least one 3D video communication receive format associated with a type of a display unit being associated with the client device; and
a processing unit operable to:
  use a preference criterion common for the plurality of client devices to determine a preference order for a plurality of 3D video transmit formats included in the sets of available 3D video communication formats;
  based on the preference order for the plurality of 3D video transmit formats, compare the sets of available 3D video communication formats to determine, for at least one client device of the plurality of client devices, a particular 3D transmit format for transmission of 3D video communication by the type of the capture unit of the at least one client device that is a preferred 3D video transmit format and corresponds to a particular 3D receive format for receipt of 3D video communication by the type of the display unit of at least one other client device; and
a transmitter arranged to transmit, to the plurality of client devices, a message comprising the particular 3D transmit format to be used by the plurality of client devices during a video conference.

19. The central device according to claim 18, wherein the message comprises one or more codec options associated with the particular 3D transmit format.

* * * * *